(12) United States Patent
Zimmer

(10) Patent No.: US 6,287,007 B1
(45) Date of Patent: Sep. 11, 2001

(54) WIPER BEARING

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/402,072

(22) PCT Filed: Jan. 20, 1999

(86) PCT No.: PCT/DE99/00114
§ 371 Date: Nov. 29, 1999
§ 102(e) Date: Nov. 29, 1999

(87) PCT Pub. No.: WO99/39945
PCT Pub. Date: Aug. 12, 1999

(30) Foreign Application Priority Data

Feb. 3, 1998 (DE) ............................................. 198 04 135

(51) Int. Cl.[7] .................................................. F16C 33/74
(52) U.S. Cl. ................................................................ 384/140
(58) Field of Search ................................... 384/140, 482, 384/297, 903, 299

(56) References Cited

U.S. PATENT DOCUMENTS 4,380,860 * 4/1983 Riester et al. .

5,809,610 * 9/1998 Eustache .

* cited by examiner

Primary Examiner—Lenard A. Footland
(74) Attorney, Agent, or Firm—Michael J. Striker

(57) ABSTRACT

The invention is based on a wiper bearing with a bearing housing (10, 12, 14, 16, 18, 20, 22, 124), in which a drive shaft (24, 26, 28) is supported with a radial bearing (30, 32, 34) and is guided on the end face by way of a stop ring (36, 106) and a crank plate (38, 40), which are connected to the drive shaft (24, 26, 28) and directly or indirectly constitute axial bearings (42, 44, 46, 48, 50, 52, 54, 56, 58, 60) with the bearing housing, wherein a seal (62, 64, 66, 68, 70, 72, 74, 76, 78, 80) rests in a sealed fashion against the bearing housing (10, 12, 14, 16, 18, 20, 22, 124) and against a part (36, 106, 38, 40) connected to the drive shaft (24, 26, 28). The proposal is made that the seal (62, 64, 66, 68, 70, 72, 74, 76, 78, 80) be disposed with a radial distance from the radial bearing (30, 32, 34) outside the axial bearing (42, 44, 46, 48, 50, 52, 54, 56, 58, 60) and seal the bearing gaps of the axial and radial bearings (42, 44, 46, 54, 56, 58, 60; 30, 32, 34) in relation to the outside.

11 Claims, 7 Drawing Sheets

WIPER BEARING

PRIOR ART

Wiper systems with a number of windshield wipers for motor vehicles are directly or indirectly fastened to their wiper bearings by way of a mounting plate on the body of the vehicle. The mounting plate has a wiper drive mechanism with a wiper motor whose motor shaft drives cranks by way of a rod assembly and these cranks are connected to one end of a drive shaft for each windshield wiper. It is also possible that only one drive shaft of one windshield wiper is driven by the wiper motor while another windshield wiper is connected to the first windshield wiper by means of a four-hinge lever mechanism and has a bearing axle. The drive shaft or the bearing axle is supported in a wiper bearing. The explanations below with regard to a drive shaft naturally also apply to a bearing axle, which is intentionally not mentioned again for the sake of simplicity.

At least one radial bearing is provided in the bearing housing and axial bearings are provided on the end faces between the bearing housing and a part affixed to the drive shaft, e.g. stop rings or a stop ring and a crank plate of the crank. The drive shaft protrudes from the vehicle body and moves a windshield wiper attached to its free end over a windshield. The bearing gaps are sealed in relation to the outside in order to prevent damaging substances such as dirt, water, corrosive substances such as salt dissolved in water, and impurities in the air from getting into the bearing gaps and destroying the bearings.

To this end, known bearing housings have an open space on one or both end faces toward the drive shaft in which an O-ring is disposed, which rests with an initial stress against the stop ring or the crank plate, the bearing housing, and the drive shaft. In bearing houses made of cast material with bearing bushes that are press-fitted into them and are as a rule made of sintered material, the bearing housing protrudes beyond the end faces of the bearing bushes, which produces the open space between the bearing bush, the stop ring or crank plate, and the bearing housing. The open space is formed onto bearing housings made of plastic. Seals of this kind increase the axial length of the bearing housing, protect only the radial bearing, and have a relatively high degree of friction.

ADVANTAGES OF THE INVENTION

According to the invention, the seal is disposed with a radial distance from the radial bearing, outside the axial bearing, and the bearing gaps of the axial and radial bearings are sealed in relation to the outside so that in comparison to the known embodiment with an O-ring, in addition to the radial bearings, the axial bearing is also protected against damaging substances. This is particularly advantageous in bearing houses made of plastic which are increasingly used due to their low cost and weight but are frequently less resistant to water and harmful substances than bearing housings made of cast material (zinc or aluminum). The plastic can prematurely age or become brittle, particularly in unprotected bearings that are placed under stress. A long service life is assured when there is a low degree of wear and low friction, since the favorable sliding properties are maintained. As a result, a low degree of bearing play can be maintained throughout the entire service life, which has a favorable effect on the vibrational behavior of the windshield wiper and therefore on the wiping quality. Furthermore, the sealing device according to the invention does not take up any additional room so that the space available can be used for a long bearing base of the radial bearing. In particular, high lateral forces can be absorbed with a low, specific material stress. Consequently, softer materials such as plastic can also be used while maintaining a long service life.

In one embodiment of the invention, the seal is non-rotatably connected to the bearing housing and rests with an axially acting sealing lip against the stop ring or the crank plate in the outer region which radially adjoins the axial bearing. Preferably, an axial lip seal is used as the seal. The lip seal can be sealed with a slight pressure, a small sliding friction surface, and therefore a small amount of sliding friction. The lip seal experiences a low degree of wear over continued operation, and a wiper drive mechanism only has to exert small freeing forces as a result of a low degree of static friction. In lieu of a lip seal, it is also possible to use a contact-free seal, for example a labyrinth seal, by means of which the sliding friction for the seal is completely eliminated.

The seal is suitably disposed in a recess of the bearing housing. In one embodiment of the invention, the bearing housing, which as a rule is comprised of cast iron, has bearing bushes press-fitted into it which are comprised for example of sintered material. On one or both end faces, the bearing bushes protrude beyond the bearing housing and in addition to radial bearings, simultaneously constitute bearing surfaces for axial bearings against a stop ring or crank plate of the drive shaft. As a result, a recess is formed between the bearing housing and the stop ring or crank plate and can favorably accommodate the seal. Furthermore, a radial bearing can be produced which has a large axial bearing base despite a short and therefore lightweight and space saving bearing housing. A favorable material used for the radial bearing is simultaneously used for the axial bearing, which can advantageously achieve a low friction in the axial bearing.

The proposal is also made to embody the bearing housing and the seal as a dual-component unit, i.e. of a rigid plastic part and a soft seal, for example a lip seal. The number of components is therefore reduced, as are the assembly costs.

In order to embody the externally visible part of the drive shaft and the bearing housing in a streamlined fashion and in particular to protect the bearing from direct splashing, it is known to dispose a protective cap on the drive shaft which encompasses the end of the bearing housing protruding outward from the vehicle body. In one embodiment of the invention, the protective cap is simultaneously used to produce a radial sealing surface for a radial seal, which seals the axial and radial bearings of the drive shaft. In the vicinity of the axial bearing, the recess for the seal is thus eliminated, which means that the bearing can be embodied as larger while taking up virtually the same radial space. The protective cap can preferably be embodied with the seal as a dual-component unit or as a one-piece component made of rubber-elastic material. The number of individual components and the assembly costs are consequently reduced. The protective cap is press-fitted onto the shaft and/or according to one embodiment according to the invention, is engaged in detent fashion with the shaft by way of an indentation in the shaft, by means of which the protective cap can be rapidly and exactly positioned when being mounted, is securely fixed in both axial directions after being mounted, and does not slip during use, which would lead to a functional failure of the seal.

The seal is preferably a lip seal, wherein other seal types are also possible by themselves or in addition, which can act axially and/or radially, for example contact-free labyrinth seals. In order to be able to easily mount the protective cap without damaging and/or folding the seal, the bearing housings have an insertion bevel in the mounting direction.

Another embodiment of the invention is comprised in fastening a rubber collar onto the bearing housing on the side of the crank plate. The rubber collar is preferably supported against the bearing housing in a first direction oriented away from the axial bearing and is supported against the crank plate or against a stop ring in a second axial direction and therefore seals the radial and axial bearing in relation to the outside.

DRAWINGS

Other advantages ensue from the following description of the drawings. Exemplary embodiments of the invention are shown in the drawings. The drawings, the description, and the claims contain numerous features in combination. One skilled in the art will also suitably consider the features individually and will combine them into other logical combinations.

DESCRIPTION OF THE EXEMPLARY EMBODIMENTS

Figure 1:
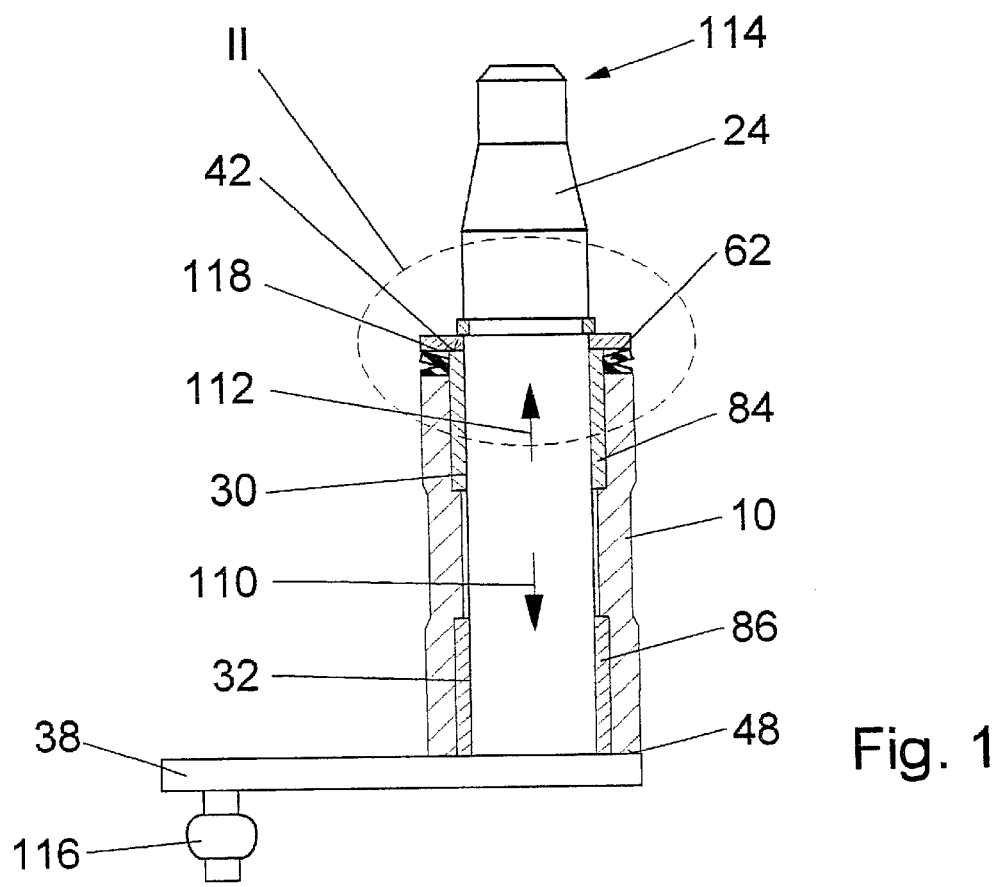
FIG. 1 shows a bearing housing of a wiper bearing.

FIG. 1 shows a bearing housing 10 of a wiper bearing made of cast iron with two bearing bushes 84, 86 made of sintered material that are press-fitted into it. The bearing housing 10 and the bearing bushes 84, 86 can also be comprised of different materials and can be connected to each other in different ways, for example by means of a frictional, positive, and/or materially adhesive connection. A drive shaft 24 is supported in the bearing bushes 84, 86 by way of two radial bearings 30, 32 in the form of sliding bearings. In a first axial direction 110, the drive shaft 24 is supported with a rotationally fixed tension ring 108 against a first axial bearing 42 by way of a stop ring 36 and the bearing surface of this first axial bearing 42 is constituted by an end face of the bearing bush 84. In a second axial direction 112, the drive shaft 24 is supported with a crank plate 38 against a second axial bearing 48. The axial bearings 42, 48 are also embodied as sliding bearings. The bearing housing 10 is fastened in a tubular recess of a base plate, which is not shown and is connected to a vehicle. The drive shaft 24 protrudes from the vehicle body with one end 114 to which a windshield wiper is attached. When a completely assembled wiper system is actuated, a motor—by way of a motor shaft, rod assembly, connecting ball 116, and crank plate 38—drives the drive shaft 24, which is connected to these parts and moves the windshield wiper over a windshield. In order to protect the bearings 42, 30, 32, 48 from water and harmful substances, the bearing housing 10 is sealed in relation to the outside, particularly on the side oriented toward the end 114 protruding from the vehicle body.

Figure 2:
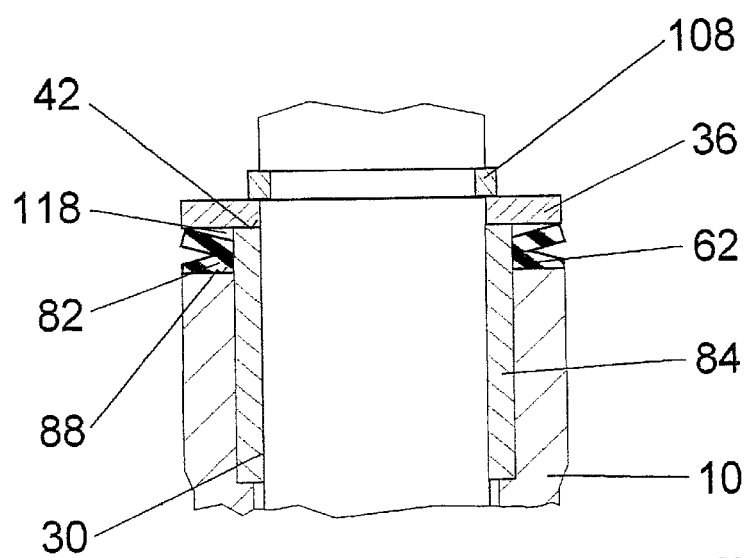
FIG. 2 shows an enlarged detail II from FIG. 1.

According to the invention, the bearing bush 84 protrudes beyond the end face 88 of the bearing housing 10 and in addition to the radial bearing 30, constitutes the axial bearing 42 for the drive shaft 24. In the axial direction 110, the drive shaft 24 is supported against the bearing bush 84 in a low friction manner. Furthermore, an intermediary space 118 is formed between the bearing housing 10 and the stop ring 36, into which an axial lip seal 62 with an axially acting lip 82 can be advantageously inserted. The lip seal 62 seals the axial bearing 42 and the radial bearing 30 toward the end 114 of the drive shaft 24 in relation to the outside. The wear is reduced and the service life is increased, particularly with a small degree of axial bearing play. Furthermore, the seal 62 is disposed radially outside the radial bearing 30. Despite a smaller structural length of the bearing housing 10, the radial bearings 30 and 32 extend over a large axial distance. The region II in FIG. 1 is shown in an enlarged fashion in FIG. 2. In the description of the remaining exemplary embodiments, the same reference numerals are used for parts which remain unchanged.

FIGS. 3 to 15 show bearing housings 12, 14, 16, 18, 20, 22, 124 made of plastic, wherein the bearing surfaces of the bearings 34, 44, 46, 50, 52, 54, 56, 58, 60 are provided directly on the bearing housing 12, 14, 16, 18, 20, 22, 124. In order to produce bearing housings that are as lightweight and inexpensive as possible, they are increasingly made of plastic. The bearing housing 12 in FIG. 3 has a recess 120 in the radially outer region of an axial bearing 44 in the direction 112 toward the end 114 of the drive shaft 24 and an axial lip seal 64 is press-fitted into this recess. It is also possible to fasten the lip seal 64 in the bearing housing 12 with other positive, frictional, and/or materially adhesive connections. In the vicinity of the lip seal 64, the bearing housing 12 has a greater wall thickness so that despite the recess 120, a sufficiently large axial bearing 44 is produced. With an intermediary piece 122, the recess 120 protects the lip seal 64 against external influences, for example protects the lip seal 64 against being damaged during installation. The lip seal 64 seals the axial bearing 44 and the radial bearing 34 in relation to the outside toward the end 114 of the drive shaft 24. The bearings 34, 44 are protected from environmental influences and the entire length of the bearing housing 12 can be used for a bearing base of the radial bearing 34. As a result, high lateral forces can be absorbed by the bearing housing 12 without deflecting the radial bearing 34. FIG. 4 shows an enlarged view of a detail labeled as IV.

Figure 5:
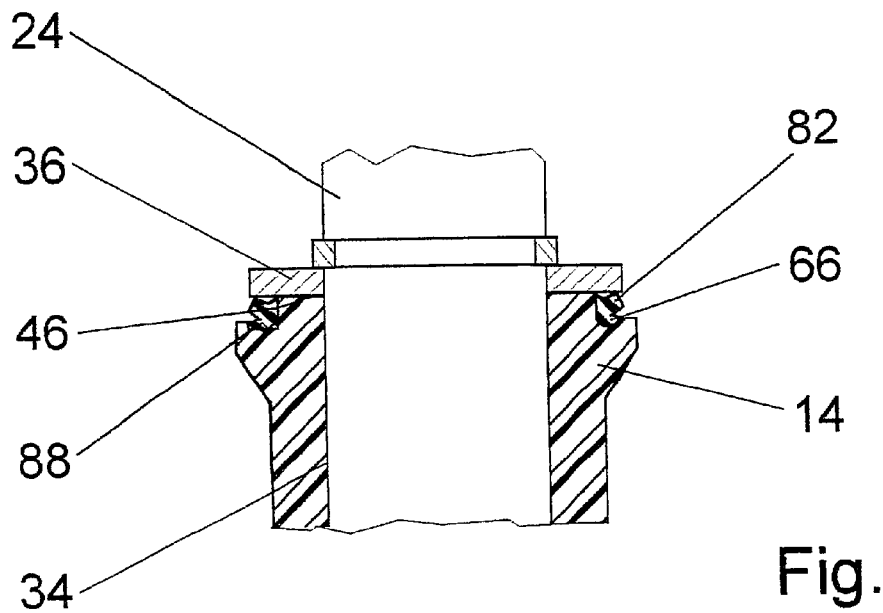
FIG. 5 shows a variant according to FIG. 4.
Figure 6:
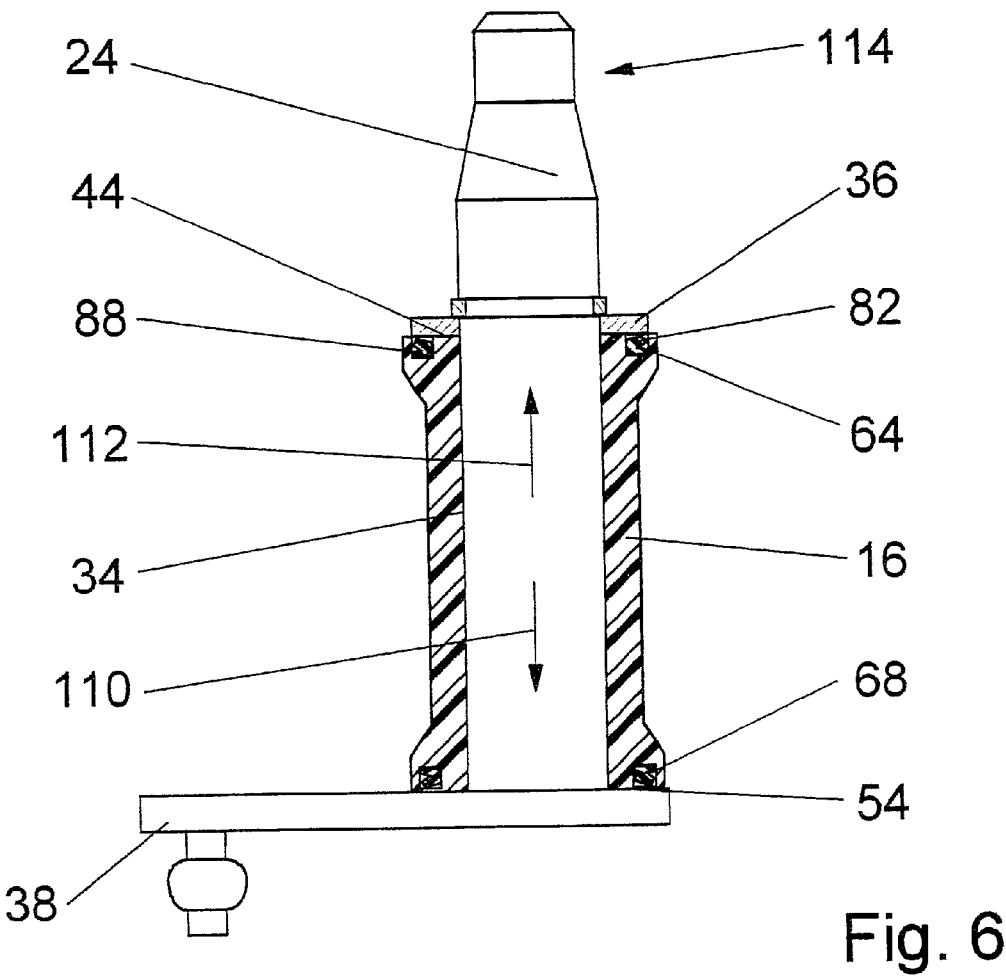
FIG. 6 shows a bearing housing that is sealed on both ends.

In FIG. 5, the bearing housing 14 and seal 66 are constituted by a dual-component unit. The seal 66 seals an axial bearing 46 and the radial bearing 34 in relation to the outside. The number of separate components is reduced and as a result, so is the manufacturing cost and/or assembly cost.

Figure 3:
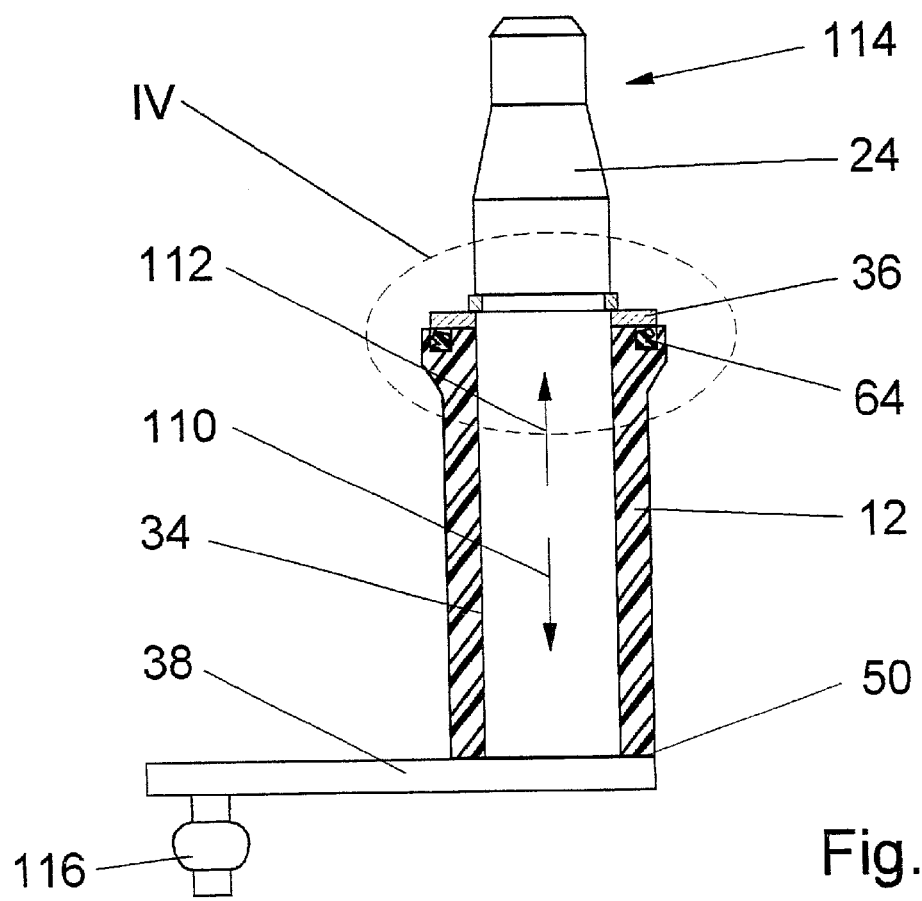
FIG. 3 shows a bearing housing made of plastic.
Figure 4:
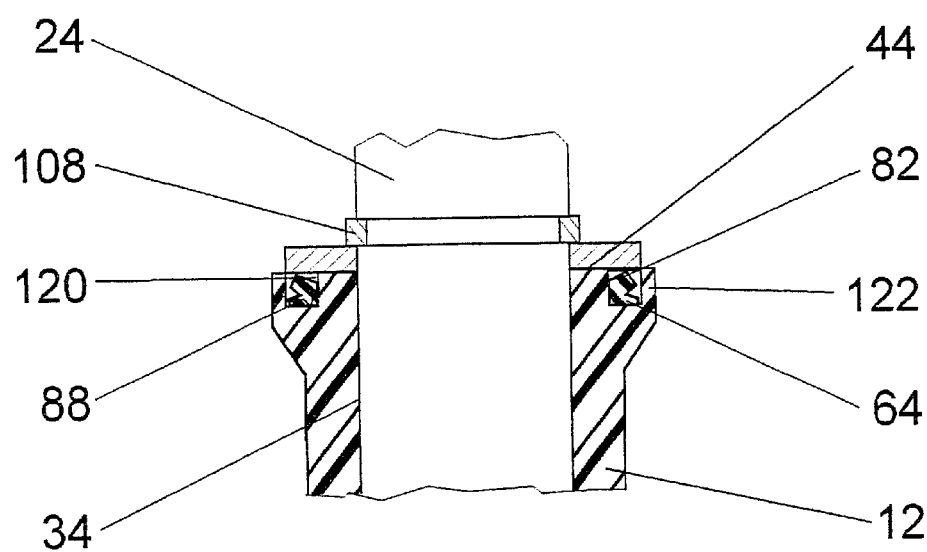
FIG. 4 shows an enlarged detail IV from FIG. 3.
Figure 7:
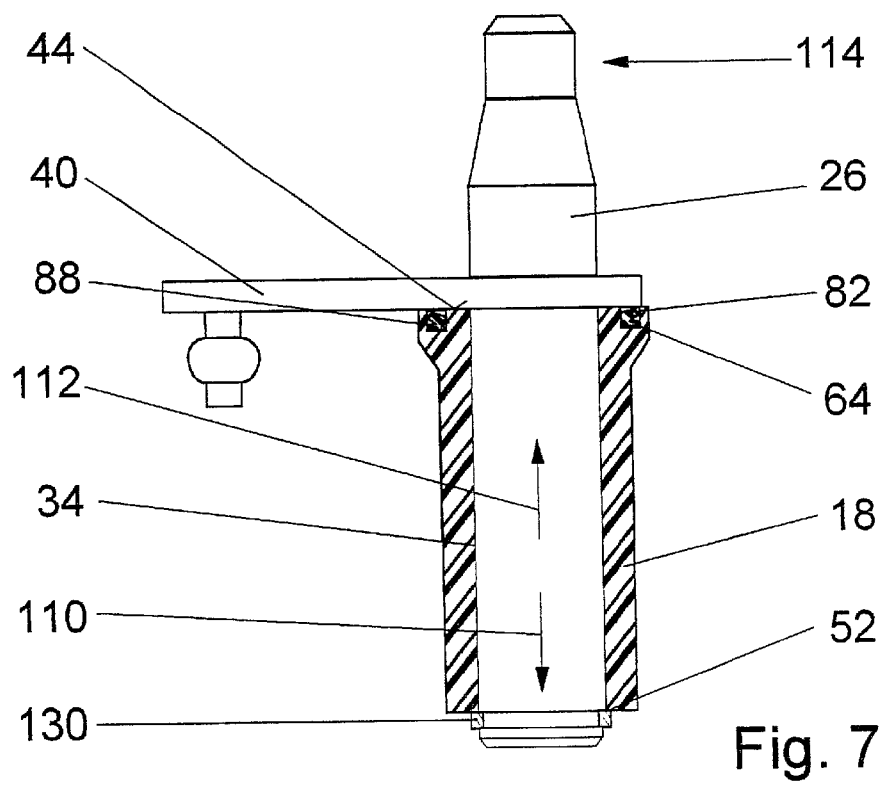
FIG. 7 shows a bearing housing with a crank plate disposed on top.

In FIG. 3, the drive shaft 24 is supported in the direction 112 with the crank plate 38 against an axial bearing 50, which is not additionally sealed in relation to the outside. Under certain conditions, however, it can be necessary to seal all of the bearings 44, 34, 54 of the bearing housing 16 on both sides (FIG. 6), for example in vehicles which will be operated under difficult conditions or in the event of a material of the bearing housing 16 that is particularly susceptible to external influences. In the exemplary embodiment in FIG. 6, the bearing 54 between the crank plate 38 and the bearing housing 16 is correspondingly sealed with a seal 68 shown in FIGS. 3 and 4. However, all of the embodiments according to the invention can basically be used on both sides of the bearing housing. In particular, the embodiments according to the invention can also be used with a crank plate 40 that is disposed on top (FIG. 7). In the bearing housing 18 in the direction 112 toward the end 114 protruding from the vehicle body, a drive shaft 26 is axially fixed to a ring 130 by way of a first, lower axial bearing 52 and is axially fixed to the crank plate 40 by way of a second, upper axial bearing 44. The upper bearing 44 between the crank plate 40 and the bearing housing 18 is sealed in relation to the outside in accordance with the exemplary embodiment described in FIGS. 3 and 4.

Figure 8:
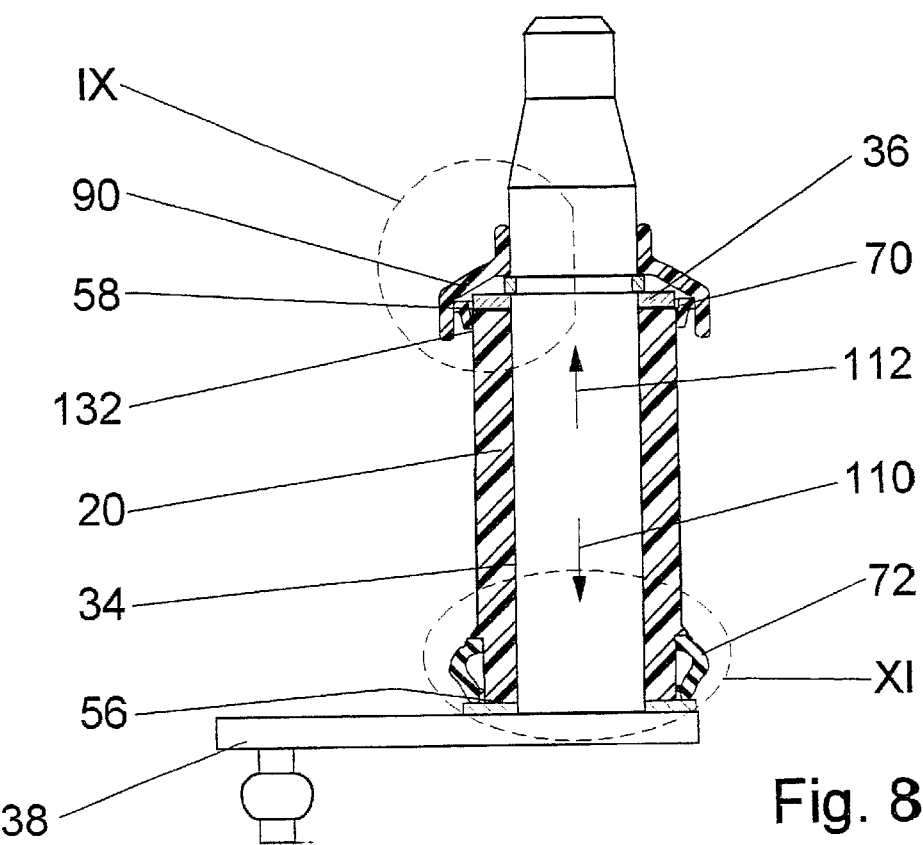
FIG. 8 shows a bearing housing with a protective cap.
Figures 9, 10:
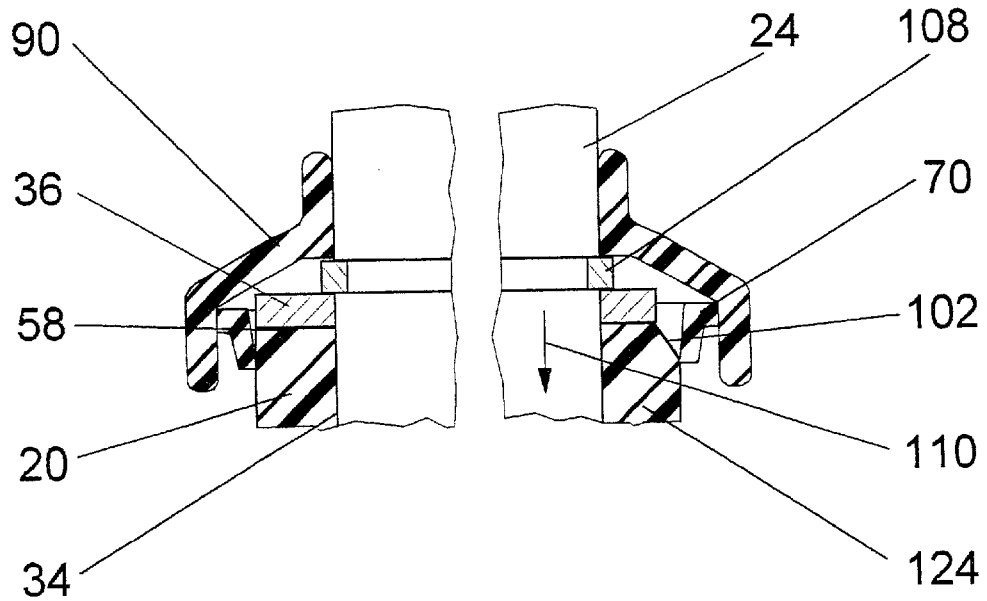
FIG. 9 shows an enlarged detail IX in FIG. 8.
FIG. 10 shows a variant according to FIG. 9.

FIG. 8 shows an embodiment with a protective cap 90 which is non-rotatably connected to the drive shaft 24 and protrudes beyond the end face of the bearing housing 20 in the direction 110 of the crank plate 38. The protective cap 90 is supported in the mounting direction 110 against the tension ring 108 and can therefore be rapidly and exactly positioned when being mounted. A radial lip seal 70 is disposed between the protective cap 90 and the bearing housing 20 and can be non-rotatably connected to the protective cap 90. An axial bearing 58 and the radial bearing 34 are sealed in relation to the outside with the lip seal 70 against a radial sealing surface 132 of the bearing housing 20. By means of the protective cap 90, the drive shaft 24 is embodied as streamlined, is protected against direct splashing, and in particular, the entire wall thickness of the bearing housing 20 can be used as a bearing surface of the axial bearing 54 (FIG. 8, 9). In order to facilitate the assembly and in particular, in order not to damage to lip seal 70, the bearing housing 124 in FIG. 10 has an insertion bevel 102 in the mounting direction 110 of the protective cap 90.

Figure 11:
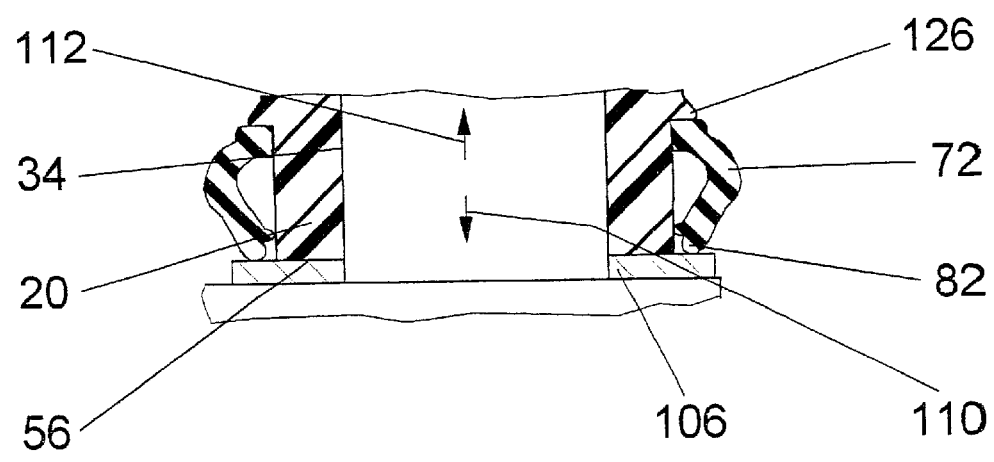
FIG. 11 shows an enlarged detail XI in FIG. 10.

FIG. 11 shows an enlarged detail XI from FIG. 8. Toward the crank plate 38, a rubber collar 72 is disposed on the bearing housing 20. The rubber collar 72 is supported in the direction 112 against a projection 126 formed onto the bearing housing 20 and is supported in the direction 110 against the crank plate 38 or against a stop ring 106. It thereby seals an axial bearing 56 between the bearing housing 20 and the stop ring 106 and seals the radial bearing 34 in relation to the outside.

Figure 12:
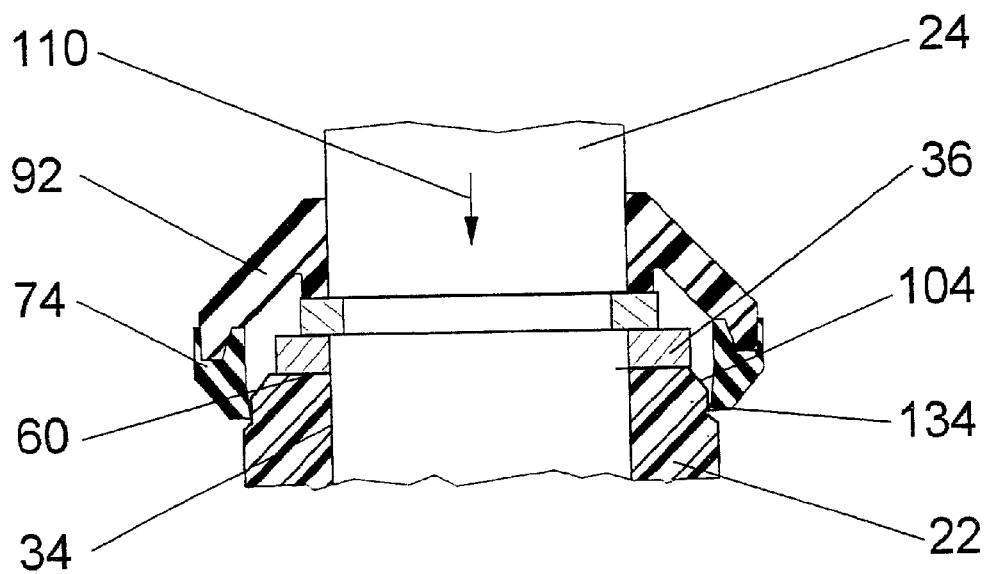
FIG. 12 shows a dual-component protective cap.
Figure 13:
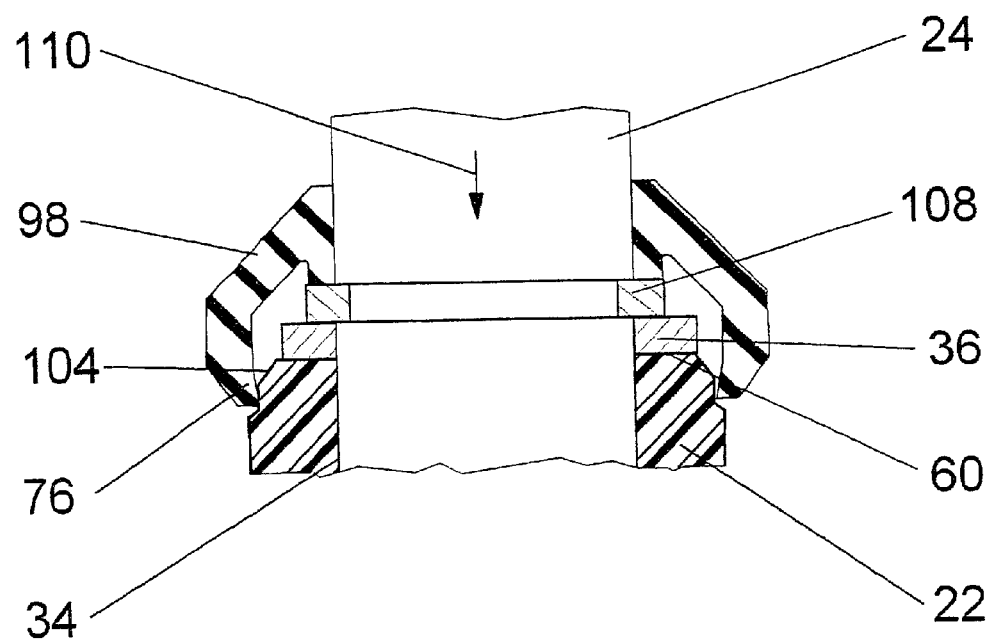
FIG. 13 shows a protective cap and a seal as a one-piece component made of rubber-elastic material.

In the exemplary embodiment in FIG. 12, a rigid plastic protective cap 92 is embodied, together with a rubber-elastic seal 74, as a dual-component unit which seals to an axial bearing 60 and the radial bearing 34 on a radial sealing surface 134. In order to be able to reliably mount the protective cap 92 with the seal 74 without damaging the seal 74 in the process, the bearing housing 22 as an insertion bevel 104 in the mounting direction 110 of the protective cap 92. FIG. 13 shows a protective cap 98 and a seal 76 embodied of one piece out of rubber-elastic material.

Figure 14:
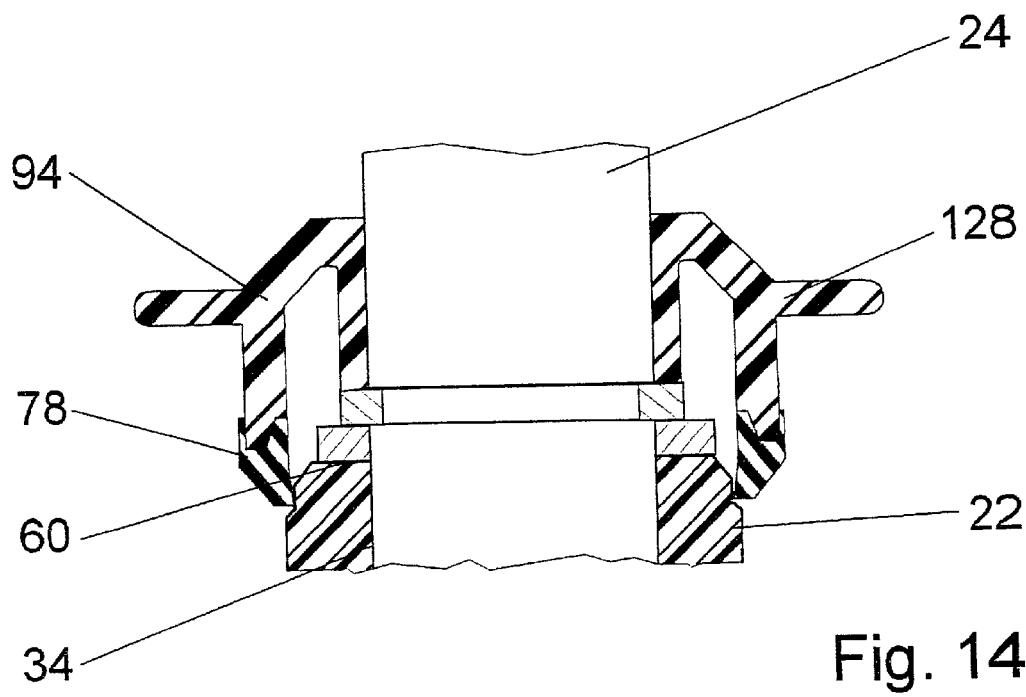
FIG. 14 shows a variant according to FIG. 12.
Figure 15:
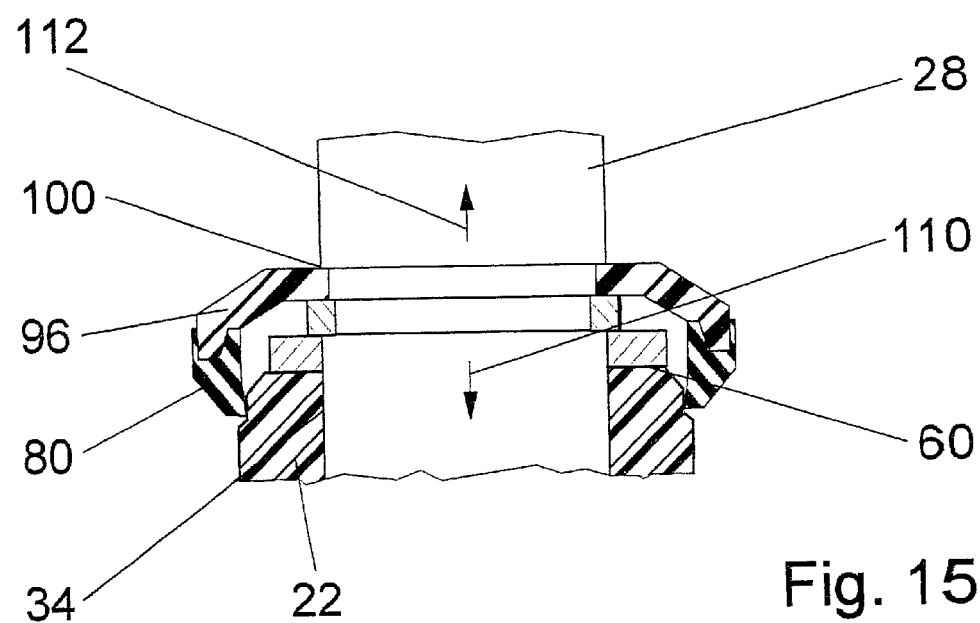
FIG. 15 shows a protective cap that is secured by way of an indentation in the shaft.

An exemplary embodiment in FIG. 14 shows a protective cap 94, together with a seal 78, as a dual-component unit. The protective cap 94 has a projection 128 that extends in the radial direction and can favorably close the mounting opening in the vehicle body.

In another exemplary embodiment, a protective cap 96 with a seal 80 is detent connected in a shaft indentation 100 of a drive shaft 28. The protective cap 96, which is embodied as a dual-component unit, is securely fixed in both axial directions 110, 112 after being mounted. The protective cap 96 does not slip, which can otherwise lead to a functional failure of the seal 80.

REFERENCE NUMERALS 10 bearing housing
12 bearing housing
14 bearing housing
16 bearing housing
18 bearing housing
20 bearing housing
22 bearing housing
24 drive shaft
26 drive shaft
28 drive shaft
30 radial bearing
32 radial bearing
34 radial bearing
36 stop ring
38 crank plate
40 crank plate
42 axial bearing
44 axial bearing
46 axial bearing
48 axial bearing
50 axial bearing
52 axial bearing
54 axial bearing
56 axial bearing
58 axial bearing
60 axial bearing
62 seal
64 seal
66 seal
68 seal
70 seal
72 seal
74 seal
76 seal
78 seal
80 seal
82 sealing lip
84 bearing bush
86 bearing bush
88 end face
90 protective cap
92 protective cap
94 protective cap
96 protective cap
98 protective cap
100 shaft indentation
102 insertion bevel
104 insertion bevel
106 stop ring
108 tension ring 110 axial direction
112 axial direction
114 end
116 connecting ball
118 intermediary space
120 recess
122 intermediary piece
124 bearing housing
126 projection
128 projection
130 ring
132 sealing surface
134 sealing surface

What is claimed is:

1. A wiper bearing with a bearing housing (10, 12, 14, 16, 18, 20, 22, 124), in which a drive shaft (24, 26, 28) is supported with a radial bearing (30, 32, 34) and is guided on the end face by way of a stop ring (36, 106) and a crank plate (38, 40), which are connected to the drive shaft (24, 26, 28) and directly or indirectly constitute axial bearings (42, 44, 46, 48, 50, 52, 54, 56, 58, 60) with the bearing housing, wherein a seal (62, 64, 66, 68, 70, 72, 74, 76, 78, 80) rests in a sealed fashion against the bearing housing (10, 12, 14, 16, 18, 20, 22, 124) and against a part (36, 106, 38, 40) connected to the drive shaft (24, 26, 28), characterized in that the seal (62, 64, 66, 68, 70, 72, 74, 76, 78, 80) is disposed with a radial distance from the radial bearing (30, 32, 34) outside the axial bearing (42, 44, 46, 48, 50, 52, 54, 56, 58, 60) and seals the bearing gaps of the axial and radial bearings (42, 44, 46, 54, 56, 58, 60; 30, 32, 34) in relation to the outside.

2. The wiper bearing according to claim 1, characterized in that the seal (62, 64, 66, 72) is non-rotatably connected to the bearing housing (10, 12, 14, 16, 18, 20) and rests with an axially acting sealing lip (82) against the stop ring (36, 106) or the crank plate (38, 40) in the outer region radially adjacent to the axial bearings (42, 44, 46, 54, 56).

3. The wiper bearing according to claim 2, characterized in that the bearing housing (10) has bearing bushes (84, 86) press-fitted into it, and at least one bearing bush (84, 86) on the end face (88) protrudes beyond the bearing housing (10) and its end face constitutes a bearing surface for the axial bearings (42) against the stop ring (36) or against the crank plate (38), wherein the seal (62) is disposed between the end face (88) of the bearing housing (10) and the stop ring (36) or the crank plate (38).

4. The wiper bearing according to claim 1, characterized in that the bearing housing (12, 14, 16, 18, 20, 22, 124) is made of plastic.

5. The wiper bearing according to claim 4, characterized in that the bearing housing (14) and the seal (66) are embodied as a dual-component unit.

6. The wiper bearing according to claim 1, characterized in that a protective cap (90, 92, 94, 96, 98) is connected to the drive shaft (24) in a rotationally fixed and sealed fashion, and a radial seal (70, 74, 76, 78, 80) is disposed between the protective cap (90, 92, 94, 96, 98) and the bearing housing (20, 22, 124).

7. The wiper bearing according to claim 6, characterized in that the protective cap (92, 94, 96) and the seal (74, 78, 80) are embodied as a dual-component unit.

8. The wiper bearing according to claim 6, characterized in that the protective cap (98) and the seal (76) are embodied of one-piece out of a rubber-elastic material.

9. The wiper bearing according to claim 6, characterized in that the protective cap (96) is detent connected in a shaft indentation (100).

10. The wiper bearing according to claim 6, characterized in that the bearing housing (124, 22) has an insertion bevel (102, 104) on the end face oriented toward the protective cap (90, 92, 94, 96, 98).

11. The wiper bearing according to claim 1, characterized in that on the end toward the crank plate (38), a rubber collar (72) is fastened to the bearing housing (20) and seals the axial bearing (56) and the radial bearing (34) in relation to the outside against a stop ring (106) or against the crank plate (38).

* * * * *